Patented Aug. 1, 1950

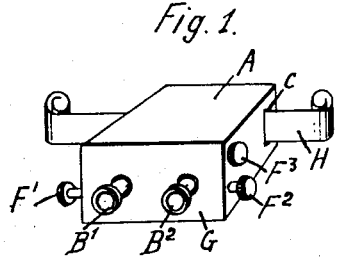
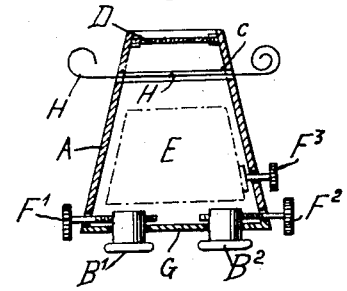
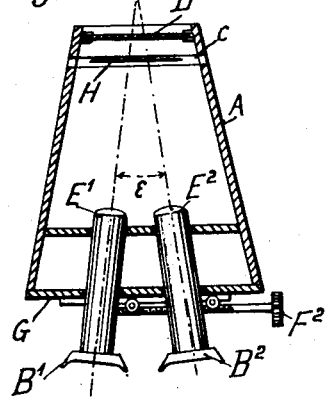
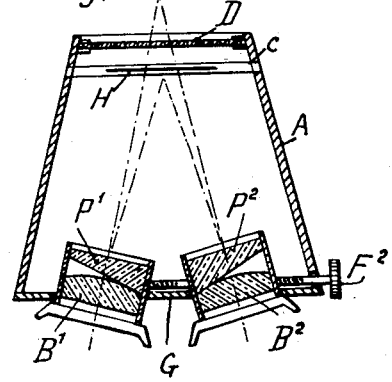
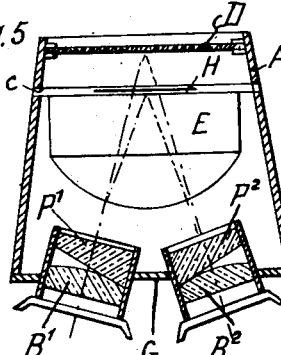
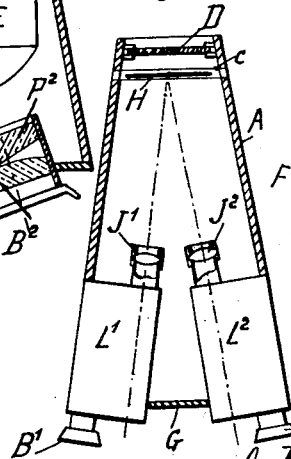
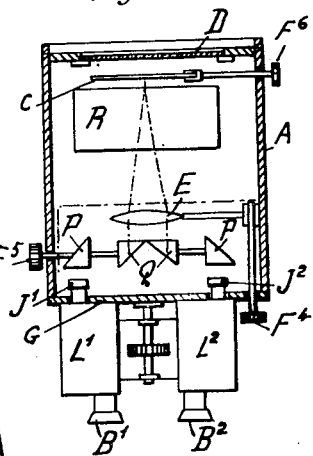

2,517,170

UNITED STATES PATENT OFFICE 2,517,170

BINOCULAR VIEWING APPARATUS FOR MICROFILMS AND THE LIKE

Maurice Emile Bernard, Paris, France

Application June 26, 1945, Serial No. 601,665
In France June 29, 1943

Section 1, Public Law 690, August 8, 1946
Patent expires June 29, 1963

3 Claims. (Cl. 88—29)

My invention has for its object means for the examination and reading of microfilms under simple and practical conditions.

It is known that there exists already in the trade different apparatuses affording means for examining positive views on films or for reading microfilms, such apparatuses being of either of the following types:

1. Sighting devices specially designed for the examination of positive photographic views on a 35 mm. film and in particular of coloured views. They are chiefly constituted by a magnifying glass wide enough for the examination of the film to be possible with both eyes. These devices have the drawback of not allowing a magnification higher than 2 or 3, which is not sufficient for the restitution of the exact perspective or for the reading of the printed matter of a microfilm.

2. Binocular magnifying glasses comprising two similar optical systems adapted to be used each with the corresponding eye and allowing the examination of different objects suitably arranged on a plate with a comparatively high magnification. The binocular glasses might serve as reading apparatuses for microfilms, but their magnification is too great and their field too small for their use to be practical for such a purpose.

For the reading of microfilms the apparatuses used heretofore are projecting apparatuses which have been specially designed for this particular purpose. Their use is practical but it is associated however with certain difficulties which are chiefly their bulk and the necessity for the observer to be stationed near an electric wallplug socket supplying current of a given voltage.

The apparatus which forms the object of my invention is of an entirely different conception which avoids the use of a projecting apparatus and requires no special illuminating means while allowing the reading of microfilms without any straining, and the easy examination of photographic views on films with a magnification and a field such that the sighting angle may be equal or even superior to the view taking angle.

In principle, the apparatus according to my invention is constituted by a casing, frame or the like support provided, on one hand, with means for receiving and guiding the microfilm and on the other hand with two eye-pieces which at the limit may be formed by two openings, said support containing a suitable optical system producing in these eye-pieces two magnified virtual images of the photographs lying in the film-receiving part.

The binocular device for sighting microfilms formed in the manner disclosed is provided with control knobs allowing the observer to adjust the eye-pieces and the optical system.

For executing this optical system it is possible without widening the scope of the invention to use according to the case optical elements and mountings of the most various types, such as those used either for binocular magnifying glasses or microscopes or in field glasses provided with prisms or in stereoscopes or else a combination of such known means.

It should be well understood that the invention includes all such modifications as fall within the scope of the appended claims.

I have therefore shown in the accompanying drawing only certain forms of execution given by way of exemplification. Figs. 1 and 2 illustrate the principle of my invention and Figs. 3 to 7 relate to different forms of execution thereof.

In its diagrammatic form, the binocular sighting device for microfilms and the like is illustrated in Fig. 1 in perspective view and in Fig. 2 in longitudinal cross-section.

It comprises a casing A in which is provided a film-carrier C behind which is mounted a ground glass D forming the bottom of the apparatus. The opposite side G carries two eye-pieces $B_1$—$B_2$ whereas inside the casing is arranged between these eye-pieces and the film-carrier an optical system E adapted to form through said eye-pieces magnified virtual images of the microfilms H or of photographic views on films lying in the film-carrier C.

The knobs $F_1$—$F_2$—$F_3$ allow the adjustment of the eye-pieces and of the inner optical system.

In the form of execution shown in cross-section in Fig. 3, the optical system is constituted by two plano convex magnifying glasses $E_1$—$E_2$ having a suitable focal distance, the optic axes of which form an acute angle $\epsilon$ the value of which is not very different from that of the normal angle of sight; through a modification in the focal lengths, this arrangement allows the obtention of variable magnifications and fields in accordance with the requirements of the user.

Fig. 4 shows a further form of execution of my invention including two eye-pieces $B_1$—$B_2$ of high magnifying power, associated with prisms $P_1$—$P_2$ the dihedral angle of which is small and the object of which is to shift the images sideways so as to reduce, for large magnifications, the convergency angle between the observer's eyes, this reduction allowing at the limit the parallelism between the sight of the two eyes, as in the case of observation at the infinite.

In the example of Fig. 5, the film-carrier is in contact or in close proximity with a thick plano convex magnifying glass E and the picture thus magnified is observed either through magnifying glasses arranged obliquely as in the case of Fig. 3 or else through eye-pieces $B_1$ and $B_2$ cooperating with prisms $P_1$ and $P_2$ as in the case of Fig. 4.

In the form of execution shown in Fig. 6 the optical problem is solved by the utilisation for each eye of a spy glass $L_1$—$L_2$, the object glass of which is provided with a cap $J_1$—$J_2$.

The optic axes of the two spy glasses are slightly inclined and this angle between said axes is all the greater for shorter focal lengths of the caps and for larger magnifications. This solution allows a very wide range of magnifications, the field covered varying in a manner reverse to the magnification. Fig. 7 shows a similar solution wherein the eyes may use a binocular glass of the usual type preferably of the prism type associated with a convergent lens E which may be adjusted definitively in position through a knob $F_4$ and which plays the part of a cap common to both object glasses $J_1$—$J_2$ of the binocular glass. Moreover the interposition of mirrors or of a set of total reflection prisms such as PQ adjustable through a knob $F_5$ allows a reduction in the diameter of the convergent lens and an increase in its power.

In this case, the casing of the apparatus is specially designed for its easy and precise adaptation to binocular glasses; i. e. it shows a bearing surface G and any suitable attachment comprising for instance two rubber rings, not shown. a knob $F_6$ serves for the easy displacement of the film-carrier C in the sighting-field.

In the case where the document under examination is a copy on paper which should be observed through reflection instead of through transparency, said document is illuminated through a reflecting surface such as a mirror mounted on a shutter the angular position of which is adjustable and which is carried inside an aperture provided in one of the walls as shown by way of example at R in Fig. 7.

The optical devices described hereinabove are given by way of example but it is possible to imagine many other equivalent devices proceeding if required from known classical systems or from those which have formed the object of the hereinbefore described forms of execution. Thus the magnifying glasses and the prisms of the arrangements of Figs. 3 and 4 may be replaced by cut lenses, after the manner of the stereoscopes used formerly. It is also possible to make use of sets of total reflection prisms, of mirrors, of glass blocks having parallel surfaces etc.

The film-carrier C may be constituted, according to the case, by:

(a) a simple slide inside which the film is adapted to move, said slide being provided with one or more frames, which may be adjustably positioned or not. The slide may be angularly adjusted so as to allow examination of pictures either lying broadwise or standing upright.

(b) a slide inside which a film-carrier may slide.

(c) a kinematographic driving mechanism provided with a hand-operated crank or with a motor whereby it is possible to make a kinematographic film progress through the apparatus.

What I claim is:

1. An optical apparatus for the binocular viewing of single pictures such as microfilm pictures or the like, comprising a casing, a diffusing element in one wall of said casing for admitting illumination, a film support located within said casing and adjacent said diffusing element in light transmitting relation thereto, a prism binocular mounted on the opposite wall of said casing to receive light transmitted through a picture held by said support, said binocular comprising a pair of monocular telescopes each having an eyepiece, a prism system and an objective lens, and a positive lens common to said telescopes mounted between said binocular and said film support, said positive lens having an aperture sufficient to transmit rays from a picture held by said support to both the objective lenses of said binocular and having a power such that the entire image on such a picture is imaged within the field of view of said binocular.

2. The invention in accordance with claim 1, in which said positive lens is spaced from said film support a distance substantially equal to its focal length, and a set of reflecting prisms disposed between said positive lens and the respective objective lenses of said binocular.

3. The invention in accordance with claim 2, in which said set of reflecting prisms comprises a pair of totally reflecting prisms located respectively in front of the objective lenses of said binocular, and a second pair of totally reflecting prisms located between the prisms of said first pair and closely adjacent one another to receive rays through said positive lens and to direct them through said prisms to said respective objective lenses.

MAURICE EMILE BERNARD.

REFERENCES CITED

The following references are of record in the file of this patent:

UNITED STATES PATENTS

| Number | Name | Date |
|---|---|---|
| 230,320 | Molera et al. | July 20, 1880 |
| 607,171 | Hill | July 12, 1898 |
| 701,788 | Berger | June 3, 1902 |
| 1,240,905 | Trappman | Sept. 25, 1917 |
| 1,470,670 | Heimstadt | Oct. 16, 1923 |
| 1,504,989 | Spitzer | Aug. 12, 1924 |
| 1,543,188 | Poser | June 23, 1925 |
| 1,963,788 | Harlow | June 19, 1934 |
| 2,279,904 | Mossman | Apr. 14, 1942 |
| 2,279,967 | Bock | Apr. 14, 1942 |
| 2,372,192 | Fassel | Mar. 27, 1945 |
| 2,377,109 | Schwarz et al. | May 29, 1945 |

FOREIGN PATENTS

| Number | Country | Date |
|---|---|---|
| 149,636 | Great Britain | Dec. 23, 1920 |
| 292,784 | Great Britain | June 28, 1928 |